United States Patent

[11] 3,632,184

[72] Inventor Michael Charles King
    Basking Ridge, N.J.
[21] Appl. No. 15,380
[22] Filed Mar. 2, 1970
[45] Patented Jan. 4, 1972
[73] Assignee Bell Telephone Laboratories, Incorporated
    Murray Hill, N.J.
    Continuation-in-part of application Ser. No.
    868,342, Oct. 22, 1969. This application
    Mar. 2, 1970, Ser. No. 15,380

[54] THREE-DIMENSIONAL DISPLAY
    12 Claims, 3 Drawing Figs.
[52] U.S. Cl....................................................... 350/9,
    178/6.5, 350/55, 350/294, 350/295
[51] Int. Cl........................................................ G02b 23/00
[50] Field of Search............................................ 350/9, 55,
    16, 294, 295; 178/6.5

[56] References Cited
    UNITED STATES PATENTS
    3,493,290 2/1970 Traub.......................... 350/295 X Primary Examiner—David Schonberg
Assistant Examiner—Toby H. Kusmer
Attorneys—R. J. Guenther and Arthur J. Torsiglieri ABSTRACT: A varifocal mirror is typically comprised of a thin aluminized Mylar film that is stretched over a loudspeaker driven sinusoidally at low frequencies. When an object is placed a short distance from the film and the film is oscillated, the position of the image of the object in the mirror will be constantly swept back and forth in the image space with an amplitude typically several times the mirror displacement. In the system herein described a first varifocal mirror is used to sweep an image of a three-dimensional scene through the first of a pair of conjugate planes of a large aperture, low $f$-number lens. Inasmuch as such a lens has a small depth of focus, only one depth plane of the scene at a time will be in focus at the second of the pair of conjugate planes of the lens. Thus, as the varifocal mirror oscillates, the images of a series to two-dimensional depth planes are formed at the second conjugate plane. These two-dimensional images are then viewed through a second varifocal mirror vibrating at the same frequency as the first mirror but 180° out of phase. Consequently, this mirror forms a series of two-dimensional virtual images each located in the correct depth plane so as to recreate the original three-dimensional scene. By recording the images formed at the second conjugate plane of the low $f$-number lens and then projecting them at the second varifocal mirror this system can be used for three-dimensional television or movies. By using a microscope to form the image that is swept through the first conjugate plane of the lens, this system can be used in three-dimensional microscopy. Alternatively, varifocal lenses can be used in place of the varifocal mirrors.

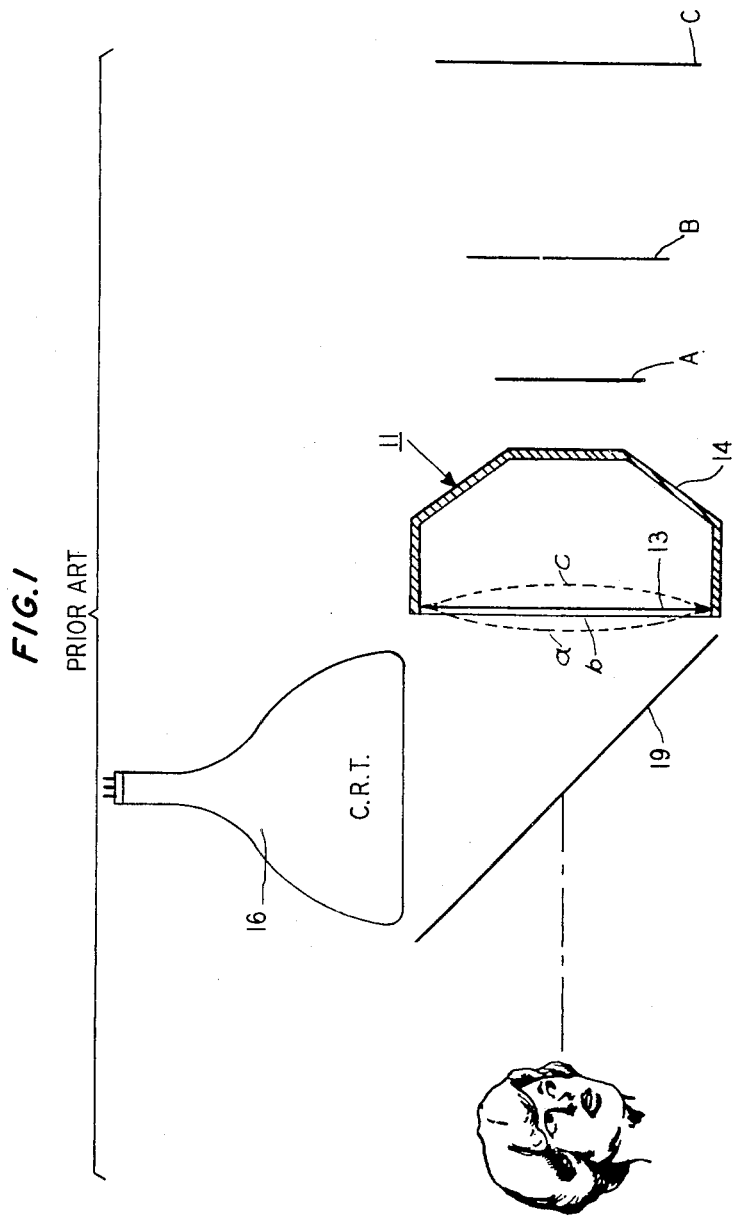

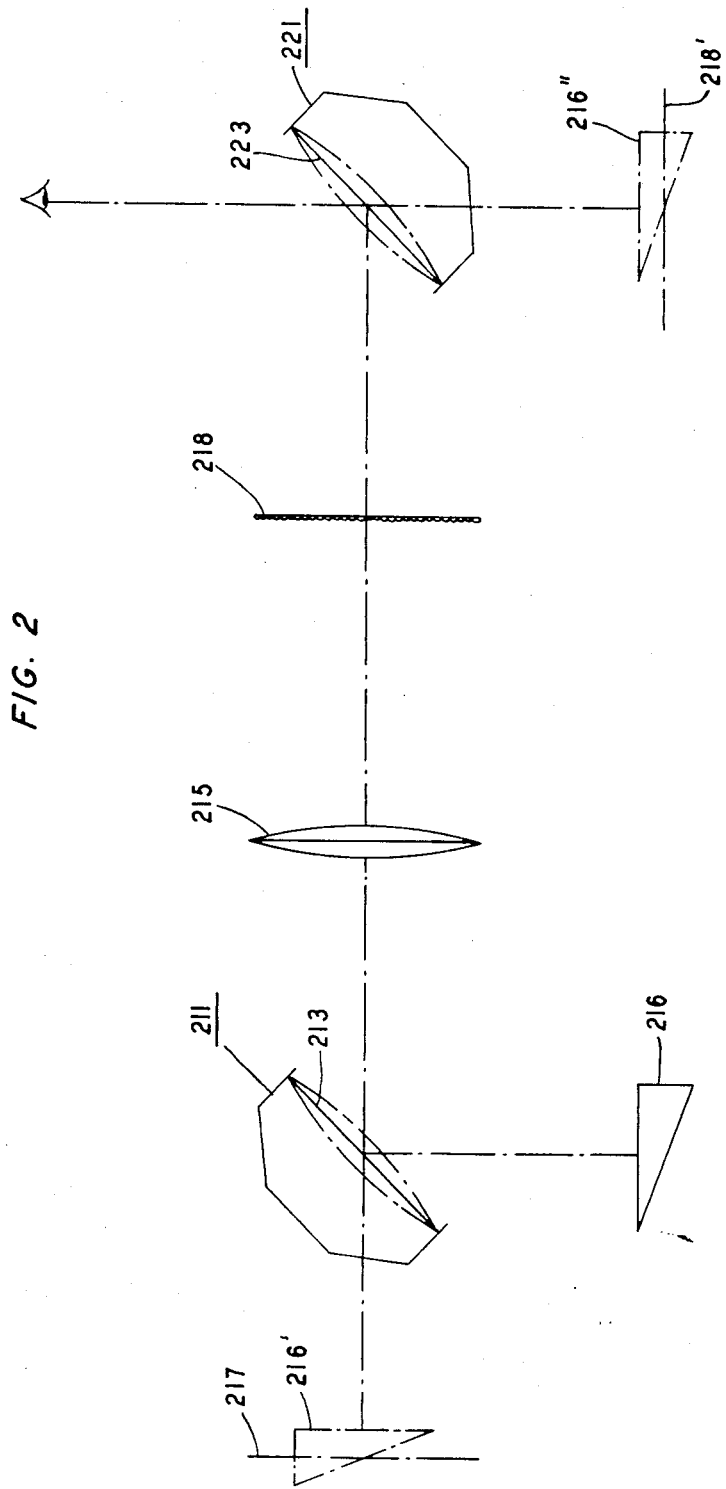

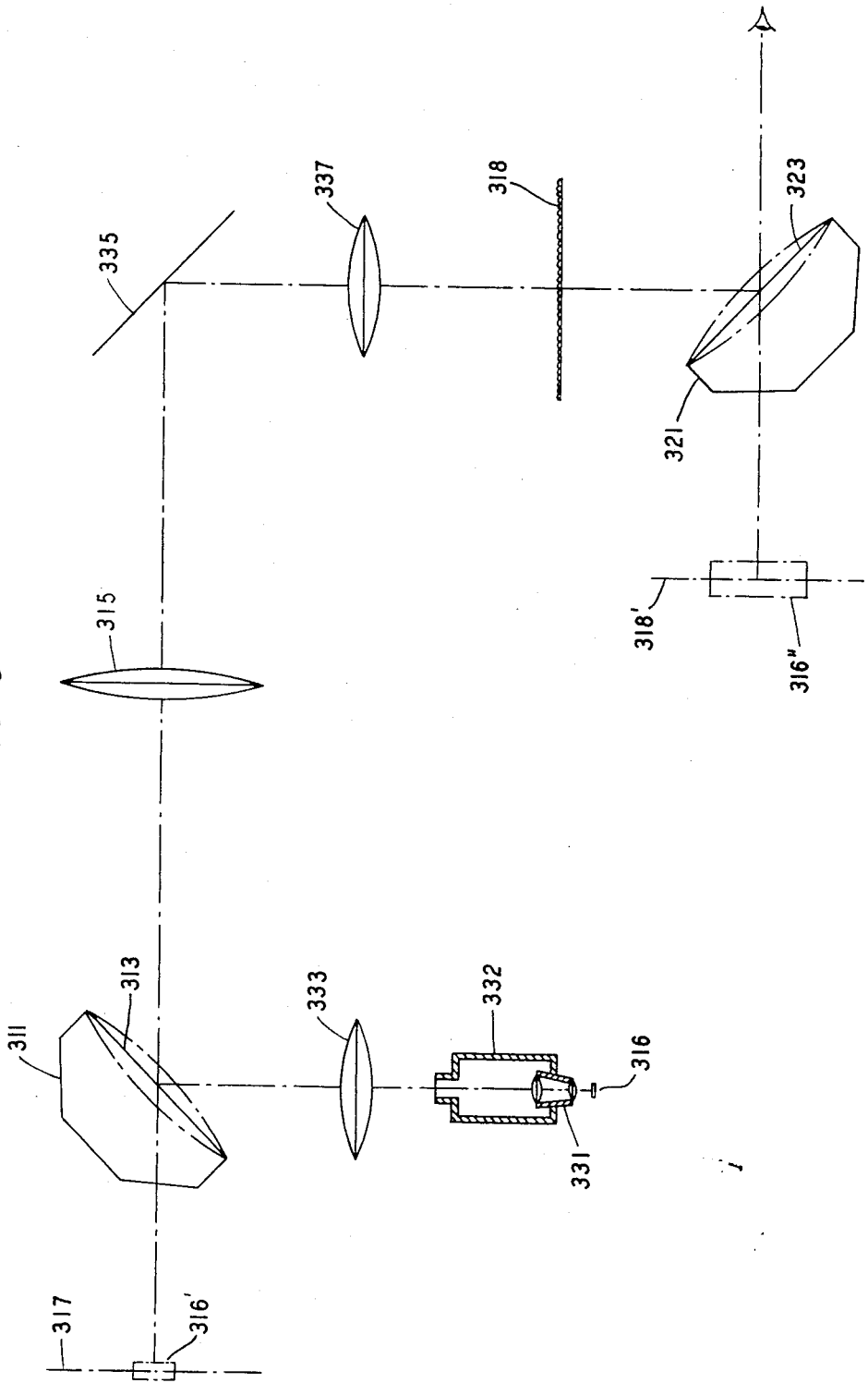

3,632,184

THREE-DIMENSIONAL DISPLAY

This is a continuation-in-part of application Ser. No. 868,342, filed Oct. 22, 1969.

BACKGROUND OF THE INVENTION

This concerns three-dimensional display.

Three-dimensional display devices can be broadly characterized as either stereoscopic or autostereoscopic. In stereoscopic systems, pairs of ordinary two-dimensional photographs are made of an object at two points of view separated by a distance ordinarily equal to that between the eyes of a viewer. The pairs of photographs are then viewed in such a way that the right eye sees only the right photograph and the left eye sees only the left photograph. As a result, each eye sees a slightly different view, thereby duplicating the conditions under which the original scene would have been viewed; and consequently, the viewer is aware of only one view that has depth. Techniques for effecting such stereoscopic viewing include the familiar stereo pair separated by an opaque screen that permits only the right eye to see the right view sad the left eye to see the left view and the method of viewing appropriate stereo pairs through polarized glasses the lenses of which are orientated to permit the viewing of only the one photograph by a particular eye.

In autostereoscopic techniques it is not necessary for the viewer to wear glasses or use other auxiliary devices to keep the views separate. Moreover, what the viewer typically sees is not a pair of two-dimensional images as in the standard stereo pair, but rather an image or set of images that either appears to be distributed over three dimensions or in fact is distributed over three dimensions. Examples of the first type of autostereoscopic imaging devices are holograms and integral photographs. Less well known are devices and techniques of the second type which are reviewed in the summary, "Three-dimensional Display," appearing in *Space/Aeronautics*, page 67 (Sept., 1962). These techniques include various methods of sweeping out a three-dimensional volume with a moving screen and displaying on the moving screen information representative of the scene at a particular point in space. They also include stationary three-dimensional arrays of wires or the like that can be made to produce light patterns by applying appropriate voltages to appropriate wires. Representative patents describing such volumetric display systems are described in my above-identified copending application.

Of particular interest to this disclosure is a new volumetric display device of the kind now called a varifocal mirror, which comprises a thin aluminized Mylar film stretched over a loudspeaker. When the speaker is driven at low enough frequencies, the film assumes the shape of a portion of the surface of a sphere of constantly changing radius. In other words, the focal length of the mirror is continuously varied. Consequently, when an object is placed a short distance from the vibrating film, the position of its image in the mirror will be constantly swept back and forth in the image space; and if the film oscillates fast enough, persistence of vision will cause the images to fuse. Moreover, when a cathode ray tube (CRT) is placed a short distance from the vibrating film of the varifocal mirror and a series of light traces are displayed in rapid succession on the CRT, the images of these traces will be observed at different planes in the image space of the mirror. And when the mirror oscillates fast enough, persistance of vision will cause the images of the light traces to fuse. Consequently, if the images of the light traces represent the exterior of a three-dimensional object, a viewer will see in the varifocal mirror a three-dimensional image of the object.

Extensive discussion and description of this variable focal length device as well as a derivation of the equations governing the image size and location may be found in the following papers: J. C. Muirhead, *Rev. Sci. Instrum.*, 32, 210 (1961), A. C. Traub, *Appl. Opt.*, 6, 1085 (June, 1967), E. G. Rawson, *Appl. Opt.*, 7, 1505 (Aug., 1968), E. G. Rawson, *IEEE Spectrum*, 6, 37 (Sept., 1969), and the book by A. C. Traub, *A New Three-dimensional Display Technique*, (Mitre Corporation, 1968). Additional details may also be found in A. C. Traub's U.S. Pat. No. 3,493,290.

A related device is a variable-power, or variable-focal length, lens such as that described by L. W. Alvarez in his U.S. Pat. No. 3,305,294. This lens comprises two thin lens elements arranged in tandem, one behind the other along the optical axis of the lens system. At least one of these lens elements is movable in a direction transverse to the optical axis and such motion varies the power, or focal length, of the lens. Consequently, although Alvarez does not appear to have realized it, the position of the image formed by the variable-power lens can be swept back and forth in the image space simply by moving one of the lens elements with an oscillatory motion. Because the image-forming properties of the Alvarez lens are so similar to those of the varifocal mirror, I will refer to such a lens as a varifocal lens.

Clearly, the varifocal principle points the way to better volumetric display devices, primarily because a small—and therefore mechanically simple—displacement of the Mylar film or the lens element produces a substantial displacement of the image of an object. However, as I indicated in my above-identified copending application, varifocal devices have not been widely used because of the difficulty of generating information to be displayed by the device. Typically, displays have been limited either to objects laboriously drawn by hand or to objects plotted by a computer as described in the aforementioned *Spectrum* article by Rawson. And while the need for a real-time display of three-dimensional images has been recognized, for example, by A. C. Traub at pages 190 and 191 of his book, no method had been disclosed prior to my copending application for effecting such a display with a varifocal device.

SUMMARY OF THE INVENTION

Accordingly, it is an object of this invention to provide for the display of three-dimensional information.

And it is a further object of this invention to provide for the display of three-dimensional images by varifocal devices.

These and other objects of my invention are achieved in an illustrative embodiment by using one varifocal mirror to form a series of two-dimensional images of different planes of a three-dimensional scene and by using a second varifocal mirror to display these two-dimensional images in three-dimensional space. The first varifocal mirror is used to form a virtual image of the three-dimensional scene and to sweep this image through the first of a pair of conjugate planes of a large aperture, low $f$-number lens. Inasmuch as such a lens has a small depth of field, only one depth plane of the scene at a time will be in focus at the second of the pair of conjugate planes of the lens. Thus, as the first varifocal mirror sweeps back and forth, the images of a series of two-dimensional depth planes are formed at the second conjugate plane. These images are then viewed through the second varifocal mirror vibrating at the same frequency as the first mirror but 180° out of phase. As a result of its motion, this mirror forms a series of two-dimensional virtual images of the original scene each located in the proper depth plane with respect to the other images. Because the mirrors are driven at a high enough frequency for these two-dimensional images to be fused by the persistence of vision of the viewer, the original three-dimensional scene is thereby re-created in real time.

As described in my copending application, such a system can be used for three-dimensional television or movies by recording the two dimensional images formed by at the second conjugate plane of the low $f$-number lens and by later projecting these images at the second varifocal mirror.

It is also possible, I have discovered, to use such a system to perceive depth in a microscopic object. As is well known, it is ordinarily impossible at high magnification to produce an image of a thick object that is in focus throughout the depth of the object. However, with the varifocal devices of my invention, it is possible both to form a series of greatly magnified, two-dimensional images of different planes of the microscopic object and to view these images at their proper relative depths in three-dimensional space.

BRIEF DESCRIPTION OF THE DRAWING

These and other elements, features and objects of my invention will be more readily understood from the detailed description of my invention taken in conjunction with the following drawing in which:

FIG. 1 shows a schematic illustration of a typical varifocal mirror of the prior art together with typical display apparatus;

FIG. 2 shows a schematic illustration of illustrative apparatus used to practice a first embodiment of my invention; and FIG. 3 shows a schematic illustration of illustrative apparatus used to practice a second embodiment of my invention.

DETAILED DESCRIPTION OF THE DRAWING

Shown in FIG. 1 is typical varifocal display apparatus of the prior art. This system is comprised of a varifocal mirror 11, a cathode ray tube 16, and a beam-splitter 19. As indicated above, varifocal mirror 11 is comprised of a thin aluminized Mylar film 13 that is stretched over a loudspeaker 14. Operation of the loudspeaker at low audiofrequencies drives film 13 from its rest position indicated at $b$ to the poles indicated at $a$ and $c$. Because the frequencies applied to varifocal mirror are typically only 15 to 60 Hz. and because the displacement, $\Delta$, between the rest position and either pole is small, the shape of the film when it is being driven is that of a portion of the surface of a sphere of constantly changing radius.

Cathode ray tube 16 is used to form light traces that are reflected by the aluminized film 13 of the varifocal mirror and observed by the viewer situated as indicated in FIG. 1. A beam-splitter 19 is used to reflect the output of the CRT onto film 13 and to transmit the light reflected by film 13 to the eyes of the viewer.

As discussed in the *Applied Optics* paper of Rawson, the location of the image of the CRT display can be found by the spherical mirror equation $$1/S + 1/S' = 2/r \quad (1)$$

where $S$ and $S'$ are the distances of the CRT display and its image, respectively, measured from the center of the displaced film and $r$ is the radius of curvature of the mirror. For convenience, it is customary to assume a fixed coordinate system with an origin at the center of the undisplaced film and to let all distances to the left of the origin be negative. If then the mirror pole displacement $\Delta$, is much smaller than either the object or image distance from the origin or the mirror diameter, which is the case for most uses of a varifocal mirror, then the distance of the image from the center of the undisplaced film in dimensionless units is given by $$\sigma' = -\sigma/(1+4\sigma\delta) \quad (2)$$

where $$\sigma' = S'_F/R, \; \sigma = S_F/R, \; \delta = \Delta/R$$

and $S'_F$ and $S_F$ are the distances of the image and the object measured from the origin and $R$ is one-half the diameter of the mirror.

From the transverse magnification formula $m = S'/S$ for a spherical mirror, the transverse magnification of an image can be determined to be $$m = 1/(1+4\delta). \quad (3)$$

Consideration of the equations specifying the image location and the magnification reveal that the image position is a nonlinear function of the distance the film is displaced from its rest position and that the magnification varies with the position of the film. These properties of the varifocal mirror are shown in the representations A, B and C of the images of the CRT display when film 13 is at positions $a$, $b$, and $c$, respectively, and the distance between the CRT display and the film is less than one-half the minimum radius of curvature of the film. Note that the height of each image, which represents its magnification, is different and that the spacing between images varies. Compensation can be made for these effects by the methods detailed by Rawson in his *Applied Optics* paper; and as a result the viewer of the varifocal mirror is able to see an array of equal-sized images of the CRT display located at equally spaced depth planes in the image space of mirror 11.

Two varifocal mirrors are used in a generalized embodiment of my invention that is shown in FIG. 2. The system for forming a series of two-dimensional images of a three-dimensional object 216 is comprised of a first varifocal mirror 211 having a reflecting surface comprised of a thin aluminized Mylar film 213, a low $f$-number lens 215 and a display screen 218 shown here as a back projection display screen. The system for reconstructing the series of two-dimensional images in the proper depth planes to re-create the original three-dimensional scene is comprised of a second varifocal mirror 221 having a reflecting surface likewise comprised of a MYlar film 223.

As indicated in FIG. 2, the image of object 216 in Mylar film 213 is located behind varifocal mirror 211 and is represented by element 216'. Similarly, the image of whatever is displayed on screen 218 is located behind Mylar film 223 and is represented by image 218'. Of course, as explained in conjunction with FIG. 1, whether reflecting surface of a varifocal mirror is vibrated, the focal length of the mirror is changed and the position of the image formed by the mirror is moved. Consequently, when film 123 is vibrated, image 216' is swept back and forth through space; and similarly, when film 223 is vibrated, image 218' is swept through space.

Lens 215 has a large diameter and a small $f$-number so that it has a very short depth of field. It is used to form on screen 218 substantially two-dimensional images of different planes of three-dimensional image 216' of three-dimensional object 216. Consequently, the power of lens 215 and the position of elements 211, 215, 216 and 218 are chosen so that when one of the conjugate planes of lens 215 is coincident with screen 218 the other conjugate plane is located in space at a point through which image 216' of object 216 can be moved by operating varifocal mirror 211. This front conjugate plane, indicated as element 217, is shown located in the center of image 216' for the case where reflecting film 213 of mirror 211 is in its undisplaced position. Obviously, when film 213 is displaced, the location of image 216' with respect to plane 217 will change. Preferably, the motion of film 213 will sweep all of image 216' through plane 217 during one period of oscillation.

To practice my invention, a low frequency signal, typically ranging between 15 and 60 Hz., is applied to varifocal mirror 211 to drive film 213 back and forth between the poles indicated by the dotted lines in FIG. 2 Object 216 is illuminated and some of the light from it is reflected by the oscillating Mylar film 213 of mirror 211. Some of this reflected light is then converged by lens 215 onto screen 218.

As indicated above, film 213 forms an image 216' of object 216; and because the shape of film 213 is that of a portion of a sphere of constantly changing radius, the location of image 216' is constantly being swept through space and, more particularly, through front conjugate plane 217 and of lens 215. (Simultaneously, the magnification of image 216' is constantly being changed, a point that will be discussed further below.) However, because lens 215 has very little depth of field, only that part of image 216' that is near front conjugate plane 217 is in focus at the rear conjugate plane of lens 215 that is coincident with back projection screen 218. Consequently, only the plane of image 216' that is located near conjugate plane 217 is clearly displayed as a two-dimensional image on screen 218. However, over a period of time equal to the period of oscillation of film 213, each of the planes of image 216' that is moved through plane 217 is displayed twice as a two-dimensional image on screen 218.

With the aid of the second varifocal mirror 221 this series of two-dimensional images of a three-dimensional object can be formed into a three-dimensional image of the object. The two-dimensional images are simply projected one at a time at Mylar film 223 which vibrates back and forth between the poles indicated by the dotted lines of FIG. 2. For the system shown in FIG. 2, the two-dimensional images are projected at the same time that they are formed on display screen 218. Consequently, the frequency of the driving signal that is applied to mirror 221 to vibrate film 223 should be the same as the frequency of the signal that is applied to mirror 211 to vibrate film 213. In addition, the phase of the driving signal applied to mirror 221 should be 180° different from that of the signal applied to mirror 211.

As indicated in FIG. 2, some of the light from each image formed on screen 218 is reflected by Mylar film 223 of the second varifocal mirror 221 to the eyes of a viewer who perceives behind film 223 a two-dimensional image 218' of the two-dimensional image displayed on screen 218. Moreover, because vibrating film 223 of mirror 221 has the shape of a portion of a sphere of constantly changing radius, the location of image 218' is constantly changing in space. Simultaneously, however, the images being displayed on screen 218 are being changed; and so different images are observed at different positions in space. Moreover, because the images that are displayed on screen 218 are a series of related two-dimensional images of the different planes of a three-dimensional object, the two-dimensional images of object 216 are properly ordered in space with respect to each other. Consequently, when the images are displayed rapidly enough to be fused by the persistence of vision of the viewer, a three-dimensional image 216'' of object 216 can be observed. In addition, because mirrors 211 and 221 are operated 180° out of phase with respect to one another, three-dimensional image 216'' is oriented toward the viewer in exactly the same way object 216 is oriented.

For a better understanding of the image-forming process, it may be helpful to detail the formation and display of two of the two-dimensional images of different planes of image 216' of object 216. First assume that film 213 of mirror 211 is located at the pole where it has a convex surface. When film 213 is in this position, image 216' is closest to lens 215; and hence it is the image of a plane at the back of image 216' that is in focus on screen 218. At the time this image is formed film 223 of mirror 221, which is operated 180° out of phase with respect to mirror 211, is located at the pole where it has a concave surface. When film 223 is in this position, image 218' is farthest from screen 218; and hence this image is seen to be located at the back of image 216''. Similarly, if film 213 is located at the pole where it has a concave surface, image 216' is farthest from lens 215; and hence if is the image of a plane at the front of image 216' that is in focus on screen 215. At this time, however, image 218' is closest to screen 218 because film 223 is located at the pole where it has a convex surface. Consequently, the image plane from the front of image 216' is displayed at the front of image 216''.

As indicated in equation (3) above, the transverse magnification of an image in a varifocal mirror varies with the position of the reflecting film. Distortion due to this transverse magnification can be eliminated if the product of the transverse magnification of varifocal mirror 211 and the transverse magnification of varifocal mirror 221 is unity. This condition can be shown to be satisfied if $$F_1 = \frac{\Delta_2}{\Delta_1} M_2 \quad (4)$$

where $F_1$ is the distance of focal plane 217 from the origin of mirror 211 as defined in conjunction with FIG. 1; $\Delta_1$ and $\Delta_2$ are the distances between the rest positions and the pole positions of films 213 and 223, respectively; and $M_2$ is the distance from screen 218 to the origin of varifocal mirror 221. Consequently, if the distance $M_2$ from screen 218 to the origin of varifocal mirror 221 in the display system is fixed and if the maximum displacement $\Delta_2$ of film 223 is known, compensation for distortion due the transverse magnification of the varifocal mirrors can be made in the image-forming apparatus simply by adjusting either or both of the characteristics of lens 215, which determine the distance of focal plane 217 from the origin of mirror 211, or the characteristics of film 213, which determine the maximum displacement $\Delta_1$ of film 213.

Distortion due to transverse and longitudinal magnification in the complete system shown in FIG. 2 is not a problem because the transverse and longitudinal magnifications are constant for the different image positions that can be formed by the varifocal mirrors. Moreover, it can be shown that these magnifications are equal to one another when the transverse magnification of the lens is $-\Delta_1/\Delta_2$.

As will be obvious to one skilled in the art, numerous modifications can readily be made to my invention. If desired, beam splitters can be used in front of the varifocal mirrors to allow other geometrical arrangements of objects and images. Such a use is described in my above-identified copending application. One of the low f-number lenses that I have used in practicing my invention was f-2.5 305 mm. Aero Ektar lens; but other lenses are suitable. The varifocal mirrors that I have used were 30-centimeter diameter mirrors similar to those described in the literature; and the signal used to drive the mirrors was typically a 15 Hz. sinusoidal signal. However, mirrors of other sizes or even the mirror of one size and one of another can be used, although the use of mirrors of two different sizes will alter the equations for elimination of distortion as set forth above. Similarly, driving signals of other frequencies and different wave shapes can be used. For example, as detailed by Rawson in his papers, a filtered sawtooth wave can be used to provide uniform spacing of the images formed in a varifocal mirror.

It is also possible to practice my invention without using varifocal mirrors. Other oscillating refracting or reflecting surfaces that sweep the images of an object through space can, in theory, be used in the practice of my invention. For example, the varifocal lens described in U.S. Pat. No. 3,305,294 can readily be adapted by one of ordinary skill in the art to the practice of my invention. One simply substitutes the varifocal lens for a varifocal mirror and rearranges the system to accommodate devices that refract light instead of reflect light. At the present time, however, because of its mechanical simplicity, low cost, and ready availability, the use of varifocal mirrors seems preferable.

There are numerous uses for a system such as that described in conjunction with FIG. 2. As explained more fully in my copending application, such a system can be used for three-dimensional television or movies by recording the two-dimensional images formed at screen 218 and by later projecting these images at the second varifocal mirror. It is also possible to use such a system to perceive depth in a microscopic object. With the first varifocal mirror and suitable optics one first forms a series of greatly magnified, two-dimensional images of different planes of a microscopic object; and with the second varifocal mirror, on is able to view these images at their proper relative depths in three-dimensional space.

An illustrative embodiment of my invention adapted for the observation of microscopic objects is shown in FIG. 3. As in FIG. 2, the apparatus of FIG. 3 for forming a series of two-dimensional images of a three-dimensional object 316 is comprised of a first varifocal mirror 311 having a reflecting surface comprised of a thin aluminized Mylar film 313, a low f-number lens 337 and a display screen 318 shown as a back projection display screen. The system for reconstructing the series of two-dimensional images in the proper depth planes to re-create a greatly magnified three-dimensional scene is comprised of a second varifocal mirror 321 having a reflecting surface likewise comprised of a Mylar film 323. In addition, the apparatus for forming the two-dimensional images comprises at least an objective lens 331 of a microscope 332. If, as is shown in FIG. 3, such a lens is used in its microscope mounting, the eyepiece of the microscope should be removed. The use of still other lenses, such as a field lens 333 and a projecting lens 315, may also be advantageous. Auxiliary devices such as a mirror 335 may likewise be used.

The optical characteristics and the arrangement of elements in FIG. 3 is such that objective lens 331 forms a three-dimensional aerial image of object 316 near field lens 333; and a three-dimensional image 316' of this aerial image is formed by Mylar film 313 behind varifocal mirror 311. Similarly, the image of whatever is displayed on screen 318 is located behind Mylar film 323 and is represented by image 318'. Of course, as explained in conjunction with FIGS. 1 and 2, when the reflecting surface of a varifocal mirror is vibrated, the focal length is changed and the position of the image formed by the mirror is moved. Consequently, when film 313 is vibrated, the image 316' is swept back and forth through space; and similarly, when film 323 is vibrated, image 318' is swept through space.

As indicated above, lens 321 is typically the objective of a microscope. Lens 333 is a field lens used to transfer the image formed by objective lens 331 to the varifocal mirror with a little loss of light as is practical. Lens 337 is a small $f$-number lens with, consequently, a very short depth of field. In conjunction with projecting lens 315, it is used to form on screen 318 substantially two-dimensional images of different planes of three-dimensional image 316' of object 316. The characteristics of image-forming elements 311, 315, 331, 333, and 337 are chosen so that when one of the conjugate planes of the lens system comprising lenses 315 and 337 is coincident with screen 318, the other conjugate plane is located in space at a plane through which image 316' of object 316 can be moved by operating varifocal mirror 311. This front conjugate plane of lenses 315 and 337, indicated as element 317 is shown located in the center of image 316' for the case where reflecting film 313 of mirror 311 is in its undisplaced position. Obviously, when film 313 is displaced, the location of image 316' with respect to plane 317 will change. Preferably, the motion of film 313 will sweep all of image 316 through plane 317 during one period of oscillation.

To view a microscopic object with the illustrative apparatus shown in FIG. 3, identical low frequency signals, typically ranging between 15 and 60 Hz. are applied to varifocal mirrors 311 and 321 to drive films 313 and 323 back and forth between the poles indicated by the dotted lines in FIG. 3. Object 316 is illuminated by an appropriate source of light such as a vertical illuminator (not shown) and some of the light from it is imaged by objective lens 331 near relay lens 333 and is reflected by the oscillating Mylar film 313 of mirror 311. Some of the reflected light is then converged by lenses 315 and 337 onto screen 318.

Film 313 forms an image 316' of the magnified image of object 316 tat lens 331 forms near lens 333. Because the shape of film 313 is that of a portion of a sphere of constantly changing radius, the location of image 316' is constantly being swept through space and, more particularly, through the front conjugate plane 317 of the lens system comprised of lenses 315 and 337. However, because this lens system has very little depth of field, only that part of image 316' that is near front conjugate plane 317 is in focus at the rear conjugate plane that is coincident with screen 318. Consequently, only the plane of image 316' that is located near conjugate plane 317 is clearly displayed as a two-dimensional image on screen 318. However, over a period of time, equal to the period of oscillation of film 313, each of the planes of image 316' that is moved through 317 is displayed twice as a two-dimensional image on screen 318.

With the aid of the second varifocal mirror 321 this series of magnified two-dimensional images of a three-dimensional object 316 can be formed into a three-dimensional image 316'' of the object. The operation is similar to that of mirror 221 of FIG. 2. As the images are formed on display screen 318, they are projected at second varifocal mirror 321 which is vibrating at the same frequency as mirror 311 but 180° out of phase. As indicated in FIG. 3, some of the light from each image forming on screen 318 is reflected by Mylar film 323 of mirror 321 to the eyes of a viewer who perceives behind film 323 a two-dimensional image 318' of the two-dimensional image displayed on screen 318. Moreover, because vibrating film 323 of mirror 321 has a shape of a portion of a sphere of constantly changing radius, the location of image 318' is constantly changing in space.

Simultaneously, however, the images being displayed on image 318 are being changed; and so as film 323 moves, different images are observed at different planes in space. Moreover, because the images that are displayed on screen 318 are a series of related two-dimensional images of the different planes of a three-dimensional object, the two-dimensional images 318' of object 316 are properly ordered in space with respect to each other. Consequently, when the images are displayed rapidly enough to be fused by the persistance of vision of the viewer, a three-dimensional image 316'' of object 316 can be observed. In addition, because mirrors 311 and 321 are operated 180° out of phase with respect to one another, three-dimensional image 316'' is oriented toward the viewer in exactly the same way as object 316 is oriented.

Again, account must be taken of the magnification introduced into the system by the lenses and the varifocal mirror. As in the case of the apparatus of FIG. 2, distortion due to the varifocal mirrors 331 and 321 can be eliminated if the product of the transverse magnification of each mirror is unity. This condition is satisfied by equation (4) above. Distortion due to transverse and longitudinal magnification in the system caused by lenses 315, 331, 333, and 337 is likewise not a problem because for the transverse and longitudinal magnifications are constant for the different image positions that can be formed by the varifocal mirrors. Hence, when the transverse and longitudinal magnifications are the same, there is no distortion. This condition is met when $$\Delta_2/\Delta_1 = -m_o m_f m_3 \quad (5)$$

where $m_o$ is the transverse magnification of the objective lens 331, $m_f$ is the transverse magnification of field lens 333, and $m_3$ is the combined transverse magnification of lenses 315 and 337.

The total transverse magnification of the system, which is $m_o m_f m_3$, is limited only by the amount of illumination that is available. I have practiced the invention with magnifications of up to 1,000 X. The depth of field that can be achieved with the invention, or object depth over which one can scan, depends on the location of the aerial image in front of varifocal mirror 311. The closer this image is to one-half the minimum radius of film 313, the greater will be the depth of scan that can be observed. For typical parameters, depths of scan of about 250 microns can be expected.

As in the case of the illustrative apparatus described in conjunction with FIG. 2, numerous modifications can be made to the apparatus of FIG. 3 without departing from the spirit and scope of my invention. While I have found it convenient simply to use an ordinary microscope with the eyepiece removed, others may find it desirable to use other objective lenses. Similarly, as indicated above, the use of field lens 333 is only to reduce light losses in the system; and if such losses can be born, the lens is not necessary. Again, I have found it desirable to use a lens system comprised of lenses 315 and 337 to form two-dimensional images of image 316'. Obviously, however, numerous other lens systems, or even a single lens such as lens 215 of FIG. 2, can be used provided they have the desired property of a limited depth of field. Similarly, different driving signals, different sized varifocal mirrors, or even one varifocal mirror of one size and one of another can be used.

In studying microscopic objects, such as integrated circuits, with my invention, I have used substantially the arrangement of apparatus indicated in FIG. 3. The microscope I used was a Bausch & Lomb model DMET microscope with various objective lenses having magnifications ranging from 10 X to 50 X with numerical apertures ranging from 0.25 to 0.85. The illuminator of the microscope is a vertical illuminator using a 200-watt Xe arc lamp. In general, I have found that the greater the intensity of illumination the better the image quality. The field lens is an $f$-6.3 lens with a 195-millimeter focal length located approximately 215 millimeters from the object, which is the distance for which the objective lens was designed.

As indicated in FIGS. 1, 2, and 3, the spacing between the varifocal mirror and the object or image that is reflected in it, such as object 16 of FIG. 1, or the aerial image formed near lens 333 of FIG. 3, is preferably less than one-half the minimum radius of the Mylar film of the varifocal mirror. Typically, the varifocal mirrors that I have used were 30-centimeter diameter mirrors similar to those described in the literature; and the signal used to drive the mirrors was typically a 60 Hz. sinusoidal signal. The lens system between the first varifocal mirror 311 and screen 318 was comprised of a first lens 315 having an $f$-number of 1.9 and a 210-millimeter focal length and a second lens 337 that was an objective lens with a magnification of 21 X and an 8-millimeter focal length. The spacing between these lenses and between image 316 and screen 318 was such that screen 318 was coincident with one of the conjugate planes of this lens system, while image 316' was in the other conjugate plane. Screen 318 was an ordinary diffuse screen. The second varifocal mirror was similar to the first and was located so that the distance between it was screen 318 was less than than one-half the minimum radius of Mylar film 323 of mirror 321.

If desirable, it is also possible to combine the apparatus of FIG. 3 with the three-dimensional television or movie apparatus disclosed in my above identified copending application. One simply forms records of the images formed on display screen 318 and then projects these records at his convenience at second varifocal mirror 321.

Numerous other applications of my invention will be obvious to those skilled in the art. For example, in addition to using my invention for viewing three-dimensional images it is also possible to use the invention to view a limited number of planes of a three-dimensional object. One can simply use a shuttering mechanism to look at a limited number, such as two, of many different images that are formed on screen 318 during each period of oscillation of mirror 311. Such a viewing system may be useful, for example, in aligning semiconductor masks with a substrate because the mask typically is at one position while the substrate is at another.

What is claimed is:

1. Image-forming apparatus comprising:
   a lens system with a short depth of field, said lens system having first and second conjugate planes;
   means on which the lens system forms an image, said means being located at the second conjugate plate of the lens system;
   oscillating means for forming an image of a scene and for moving said image through the first conjugate plane of the lens system to form at the second conjugate plane a plurality of images that are images of different depth planes of the scene; and
   oscillating means for forming at different apparent distances from the point at which may they are detected images of the images formed at the second conjugate plane.

2. The apparatus of claim 1 wherein:
   the oscillating means for forming the image of a scene and of a moving said image through the first conjugate plane of the lens system comprises a first spherical mirror with a variable radius of curvature or a second lens with a variable focal length and
   the oscillating means for forming images of the images formed at the second conjugate plane comprises a second spherical mirror with a variable radius of curvature or a third lens with a variable focal length.

3. The apparatus of claim 1 wherein:
   the oscillating means for forming an image of the scene and for moving said image through the first conjugate plane comprises a first spherical mirror and means for varying its curvature;

the oscillating means for forming images of the images formed at the second conjugate plane comprises a second spherical mirror and means for varying its curvature; and $$F_1 = \frac{\Delta_2}{\Delta_1} M_2$$

where $F_1$ is the distance between the first conjugate plane of the lens system and the center of the first spherical mirror when the mirror is not being oscillated, $\Delta_1$ and $\Delta_2$ are the maximum displacements of first and second spherical mirrors, respectively, from their positions when they are not being oscillated, and $M_2$ is the distance between a display means and the center of the second spherical mirror when the mirror is not being oscillated.

4. The apparatus of claim 3 wherein the frequency of oscillation of the second spherical mirror is approximately 180° out of phase with the frequency of oscillation of the first spherical mirror.

5. The apparatus of claim 3 wherein the transverse and longitudinal magnifications of the apparatus are equal.

6. The apparatus of claim 1 wherein:
   oscillating means for forming an image of the scene and for moving said image through the first conjugate plane of the lens system comprises a first movable reflecting or refracting means; and
   the oscillating means for reconstructing the images formed at the second conjugate plane comprises a second movable reflecting or refracting means.

7. The apparatus of claim 1 wherein:
   the oscillating means for forming an image of the scene comprises a first spherical mirror with variable radius of curvature or a second lens with a variable focal length; and
   the apparatus further comprises and objective lens that forms an aerial image of the scene in front of the first spherical mirror or the second lens.

8. The apparatus of claim 8 wherein:
   the lens system comprises a lens having a low $f$-number and a projection lens; and
   the apparatus further comprises a field lens located near the aerial image.

9. A method for forming images of a scene comprising the steps of:
   forming an image of the scene and moving said image in oscillatory motion through the first of a pair of conjugate planes of a lens system having a short depth of field to form at the second of the pair of conjugate planes a plurality of images that are images of different depth planes of the scene; and
   forming at different apparent distances from the point at which they are detected images of the images formed at the second conjugate plane.

10. The method of claim 10 wherein:
    the image of the scene is formed and moved through the first of the pair of conjugate planes of the lens system by varying the radius of curvature of a first spherical mirror or the focal length of a second lens; and
    the images of the images formed at the second conjugate plane are formed at different apparent distances by varying the radius of curvature of a second spherical mirror or the focal length of a third lens.

11. The method of claim 11 wherein the radius of curvature of the second spherical mirror or the focal length of the third lens is oscillated approximately 180° out of phase with the radius of curvature of the first spherical mirror or the focal length of the second lens.

12. The apparatus of claim 9 wherein the means on which the lens system forms an image is a display screen.

* * * * *